United States Patent [19]

Chambers

[11] 4,073,003
[45] Feb. 7, 1978

[54] POWER SUPPLY

[75] Inventor: Derek Chambers, Framingham, Mass.

[73] Assignee: Raytheon Company, Lexington, Mass.

[21] Appl. No.: 643,735

[22] Filed: Dec. 22, 1975

Related U.S. Application Data

[60] Continuation of Ser. No. 478,484, June 12, 1974, abandoned, which is a continuation of Ser. No. 291,123, Sept. 21, 1972, abandoned, which is a division of Ser. No. 397,562, Sept. 14, 1973, Pat. No. 3,836,813, which is a continuation of Ser. No. 224,202, Feb. 7, 1972, abandoned.

[51] Int. Cl.² .......................................... H02M 3/335
[52] U.S. Cl. ...................................... 363/20; 307/17
[58] Field of Search ................. 321/2, 18; 331/112, 331/153; 307/75, 269, 17

[56]  References Cited

U.S. PATENT DOCUMENTS

| 3,284,696 | 11/1966 | Nagata et al. | 321/16 X |
| 3,596,165 | 7/1971 | Andrews | 321/18 X |
| 3,675,115 | 7/1972 | O'Loughlin | 321/2 X |

Primary Examiner—William M. Shoop
Attorney, Agent, or Firm—John R. Inge; Milton D. Bartlett; Joseph D. Pannone

[57] ABSTRACT

A synchronized power supply for use with display systems and data processing equipment in general in which information is displayed on a screen such as a cathode ray tube in which the power supply is synchronized to the display such that internal synchronization is maintained regardless of variation in external synchronization. A unique converter arrangement transfers regulated power to the loads at high efficiency such that both improved power supply and display operation result.

17 Claims, 8 Drawing Figures

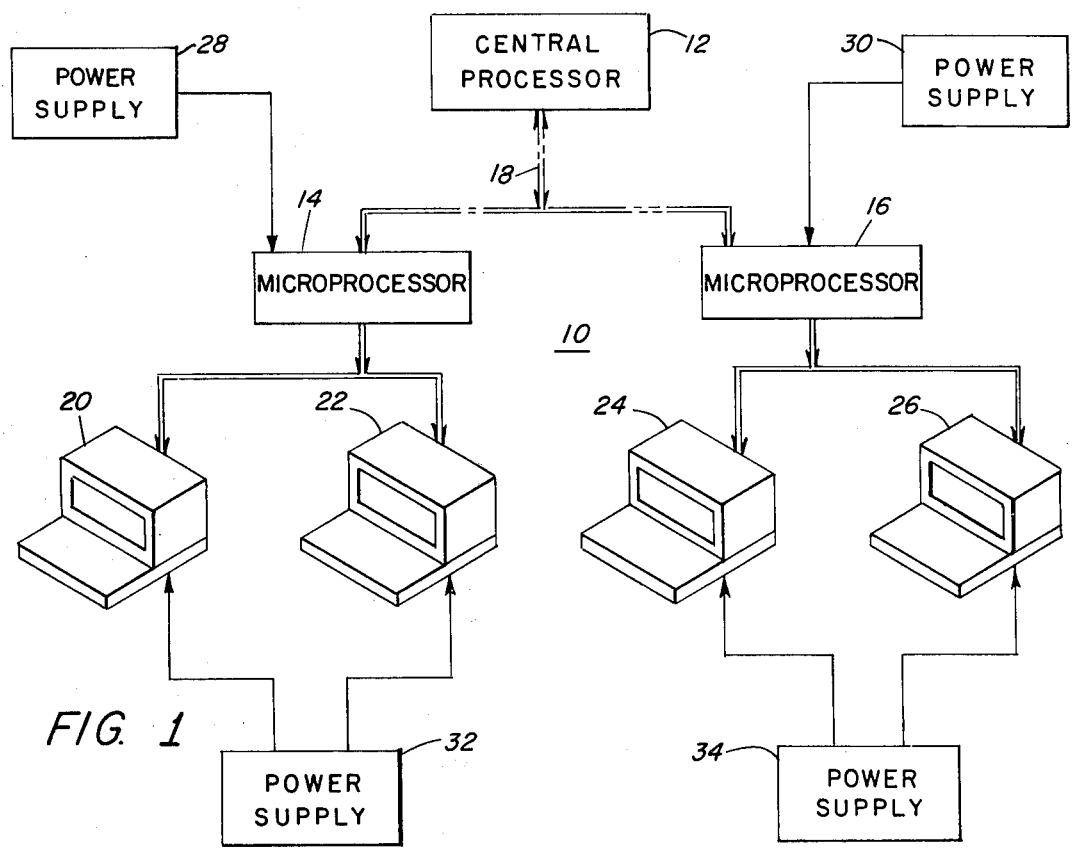
FIG. 1
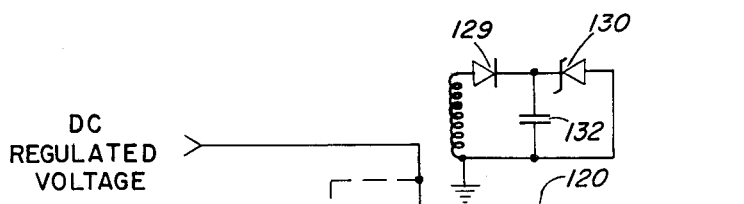
FIG. 2
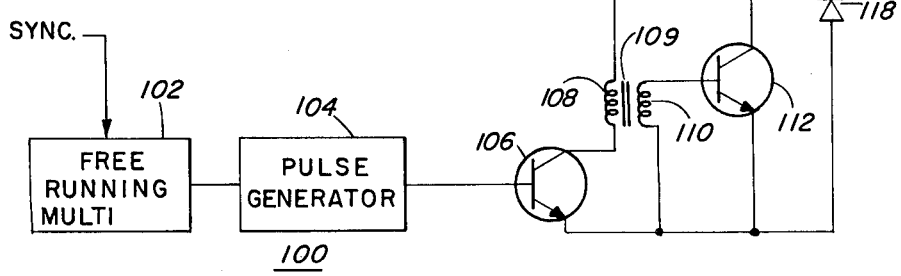

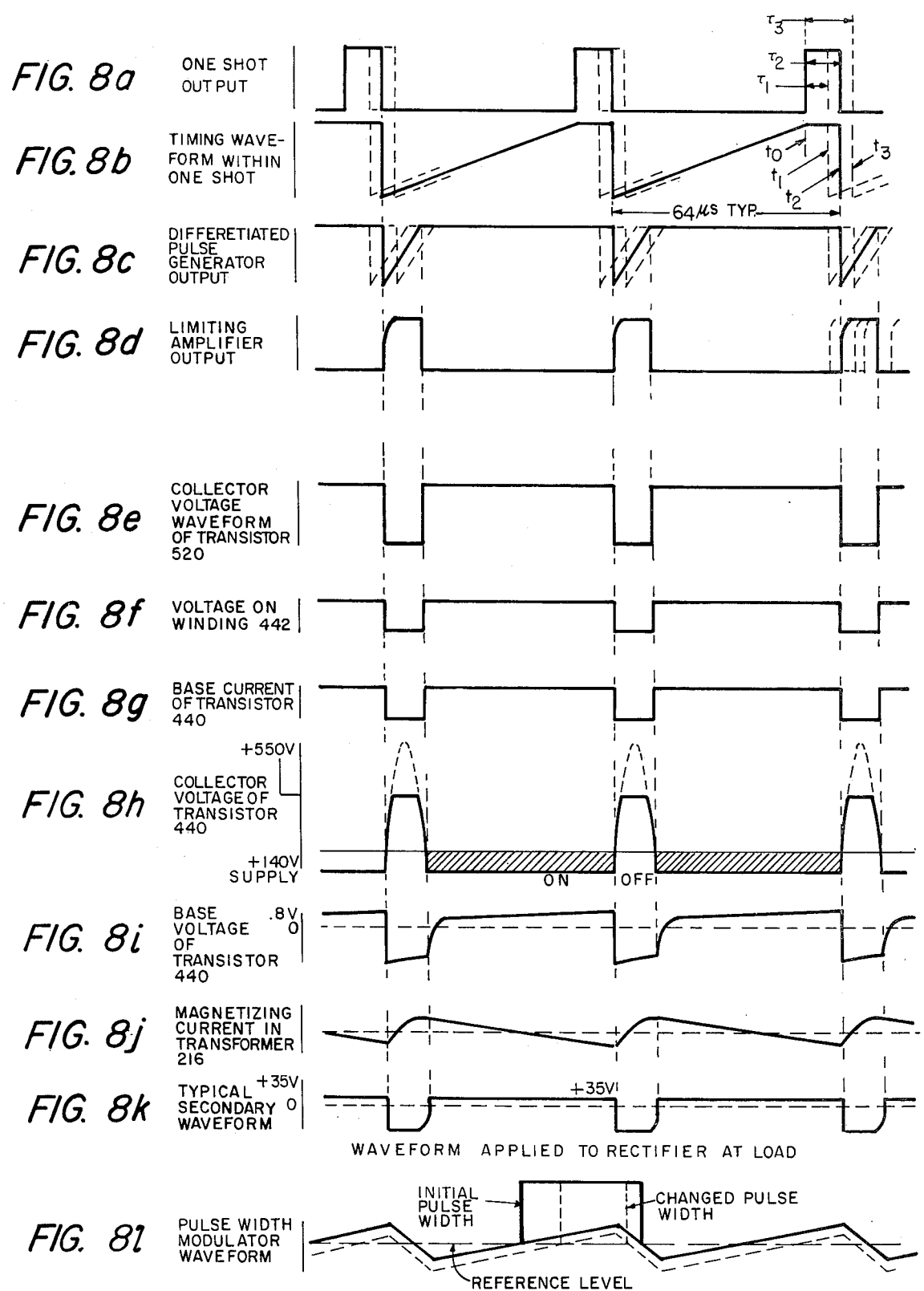

POWER SUPPLY

CROSS REFERENCE TO RELATED APPLICATIONS

This is a continuation of application Ser. No. 478,484 filed June 12, 1974 now abandoned, which is a continuation of application Ser. No. 291,123 filed Sept. 21, 1972 (now abandoned), which is a division of application Ser. No. 397,562 filed Sept. 14, 1973 (now U.S. Pat. No. 3,836,813), which is a continuation of application Ser. No. 224,202 filed Feb. 7, 1972 (now abandoned).

BACKGROUND OF THE INVENTION

This invention relates to power supplies for use with digital systems such as computers, computer peripheral equipment, displays in which characters are repetitively displayed on the screen of a cathode ray tube in raster, dot matrix or other arrangements, and in systems in general in which high efficiency and accurate synchronization are required.

With the development of ever more complex and compact computer peripheral systems and subsystems such as displays, programmable displays and processors for programming and routing the logical functions between a central computer and groups of displays, the requirements for increased efficiency and accurate synchronization have been increased. The use of integrated circuitry in compact assemblies has made heat dissipation from conventional power supplies a problem, since more power must be generated within a smaller volume. The prior art series pass regulated power supply of approximately 30 percent efficiency has severe heat dissipation problems, and losses in the conventional switching regulator-converter design of approximately 60 percent efficiency cannot be tolerated in applications having small package requirements for the power supply.

In power supplies of the prior art, which have been employed in multiple display systems, the heat buildup at the switching and converter stages is such that a major portion of the system volume must be utilized to accommodate the heat which must be dissipated. Additionally, in many prior art systems, the frequency of operation of the switching power supply is not synchronized to the system so that transients and ripple from the supply can cause interference with circuit operation. In computer driven semiconductor memories, this is catastrophic since removal of power from the memory results in loss of data.

SUMMARY OF THE INVENTION

A fully synchronized regulated power supply is disclosed in combination with systems, such as multiple display and processing systems, in which high efficiency and precise synchronization are required. A novel DC-to-DC converter of high efficiency in which a single transistor couples power to a load is disclosed. This switching transistor is switched only when its voltage is zero, thereby preventing heat buildup. An asymmetric power waveform is generated which transfers power only during the transistor ON time with energy developed during the OFF time being coupled back into the power supply. A novel synchronization circuit enables the power supply to accommodate predetermined changes in the external synchronization rate without loss of synchronization, while at the same time maintaining the capability to automatically internally synchronize at a predetermined rate when the external synchronization varies beyond predetermined limits.

BRIEF DESCRIPTION OF THE DRAWINGS

Other and further objects and advantages of the invention will become apparent in connection with the accompanying drawings wherein:

FIG. 1 illustrates a block diagram of a multidisplay system embodying the invention;

FIG. 2 is a combined block and schematic diagram of a DC-to-DC converter in accordance with the present invention;

FIG. 8 is a series of waveform diagrams of interest in the present invention.

DESCRIPTION OF THE PREFERRED EMBODIMENTS

Figure 3:
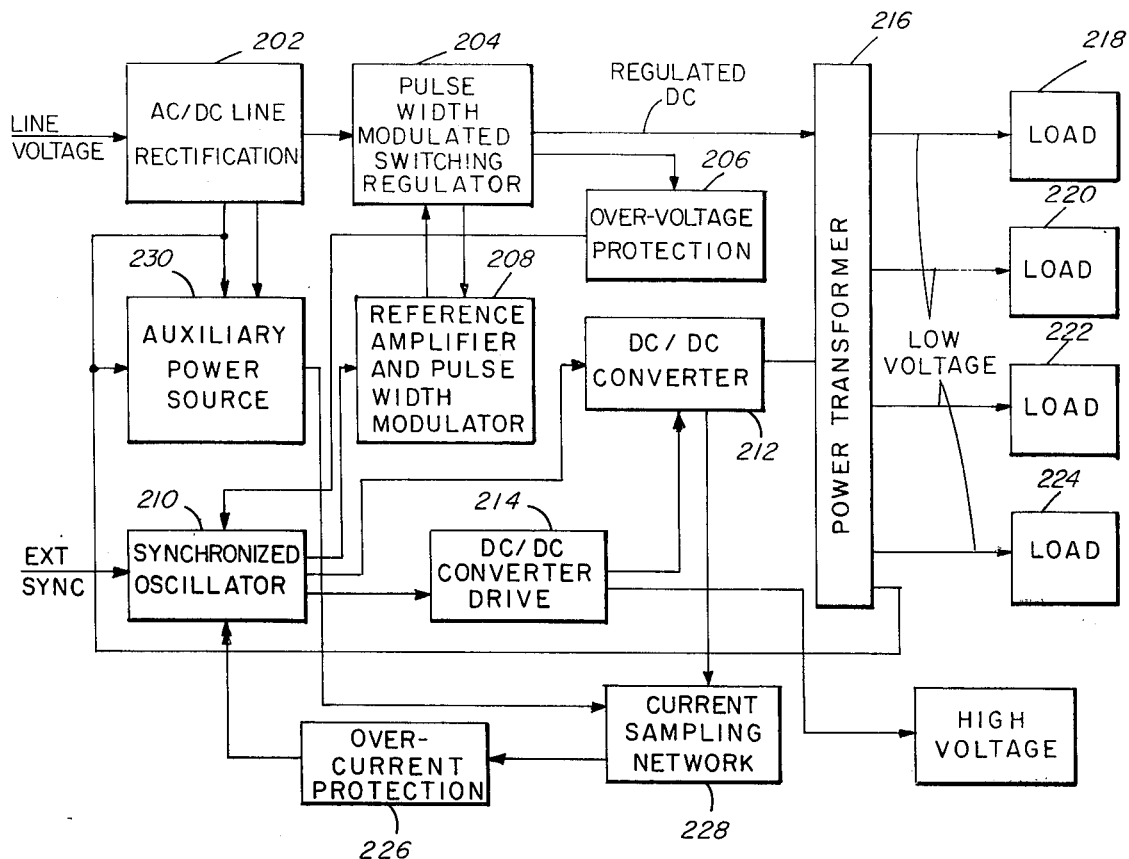
FIG. 3 illustrates a block diagram of a synchronized switched power supply in accordance with the present invention.

Referring to FIG. 1, a data communications system of the type in which a central processing unit interconnects a plurality of local computers at a plurality of locations is disclosed generally at 10. A central processor 12, which is a general purpose computer, stores data for ultimate retrieval and functional data routing requirements for a plurality of smaller capacity computers or microprocessors, shown generally as 14 and 16, although more microprocessors may be employed. This data is coupled over standard communication channels 18, which may be telephone lines to the microprocessors, which may be located either in various cities or at different sites within one city, such as in a large bank. Each microprocessor contains all of the data required for a plurality of output terminals, which may be visual displays of, for example, the cathode ray tube type in which a viewer has instantaneous access to the data displayed. The use of microprocessors makes the displays "programmable" in the sense that the microprocessor assumes most of the functions of the central computer, thereby reducing the access time required between the individual displays and the central computer. Visual display units 20 and 22 are controlled by microprocessor 14 and visual display units 24 and 26 are controlled by microprocessor 16. Of course, any number of displays may be controlled by each microprocessor, depending only on the storage capacity and programming, and the illustrated displays are by way of example only.

Microprocessors 14 and 16 and displays 20 through 26 require highly efficient synchronized power supplies of the type herein disclosed due to their large amounts of integrated circuitry contained in rather compact units and the enormous data handling requirements associated therewith. Power supplies 28 and 30 supply microprocessors 14 and 16 respectively with closely regulated synchronized voltage required thereby while supplies 32 and 34 supply the groups of displays associated respectively with microprocessors 14 and 16 with power for all of the circuitry contained therein, except for the high voltage of about 7 kilovolts required for the anodes of the cathode ray tubes of the displays. This voltage can be obtained either from an external high voltage source or from the present power supplies by multiplying one of the output voltages up to the required anode voltage.

Switching power supplies utilizing a push-pull converter and multiple regulated outputs generally have an efficiency of about 60%, depending upon such factors as the input voltage swing, the output voltages to be generated and the type of load to be supplied.

In two transistor switching regulator converters, about half of the total losses could occur in the switching regulator transistor and in the push-pull converter transistors with typically 20 percent of this half of the total losses occurring in the switching transistor and the other 80 percent of the half of the total losses occurring in the push-pull transistors.

Switching of transistors occurs with severe power losses and consequent heat generation since when one transistor is OFF, the other transistor is ON, thereby generating a square wave. There is always a certain amount of storage, typically between 1 and 2 microseconds, which represents the charge storage in the base-emitter junctions of the transistors. Since the switching transistors must be operated in saturation to conserve power, substantial energy is required to turn them OFF because full current flows through the transistor being switched ON while its voltage is near maximum, when one transistor is turned OFF by the other being switched ON, because of the inherent storage problem, thereby generating power and heat. This loss is eliminated in the present invention, as will be described, since a one transistor switch, rather than a two transistor switch, is employed for DC-to-DC conversion. By employing a single transistor, switching ON occurs with zero voltage across the transistor as does switching OFF, thereby resulting in negligible heat losses and much greater efficiency since the primary source of heat generation in the power supply is eliminated.

Referring now to FIG. 2, a simplified circuit diagram of a DC-to-DC converter in accordance with this invention is illustrated generally at 100. A synchronization signal is developed at a free-running oscillator comprising a one-shot multivibrator and Schmitt trigger 102, which signal may be either external or internal, as explained with reference to FIG. 6. The synchronizing signal is typically about 15.6 KHz, with the leading edge synchronized in the internal mode by the output of a Schmitt trigger. Waveform 8(a) is the output of multivibrator 102 synchronized by the Schmitt trigger output shown by waveform 8(b). The Schmitt trigger operation is explained in detail with reference to FIG. 6.

Figure 6:
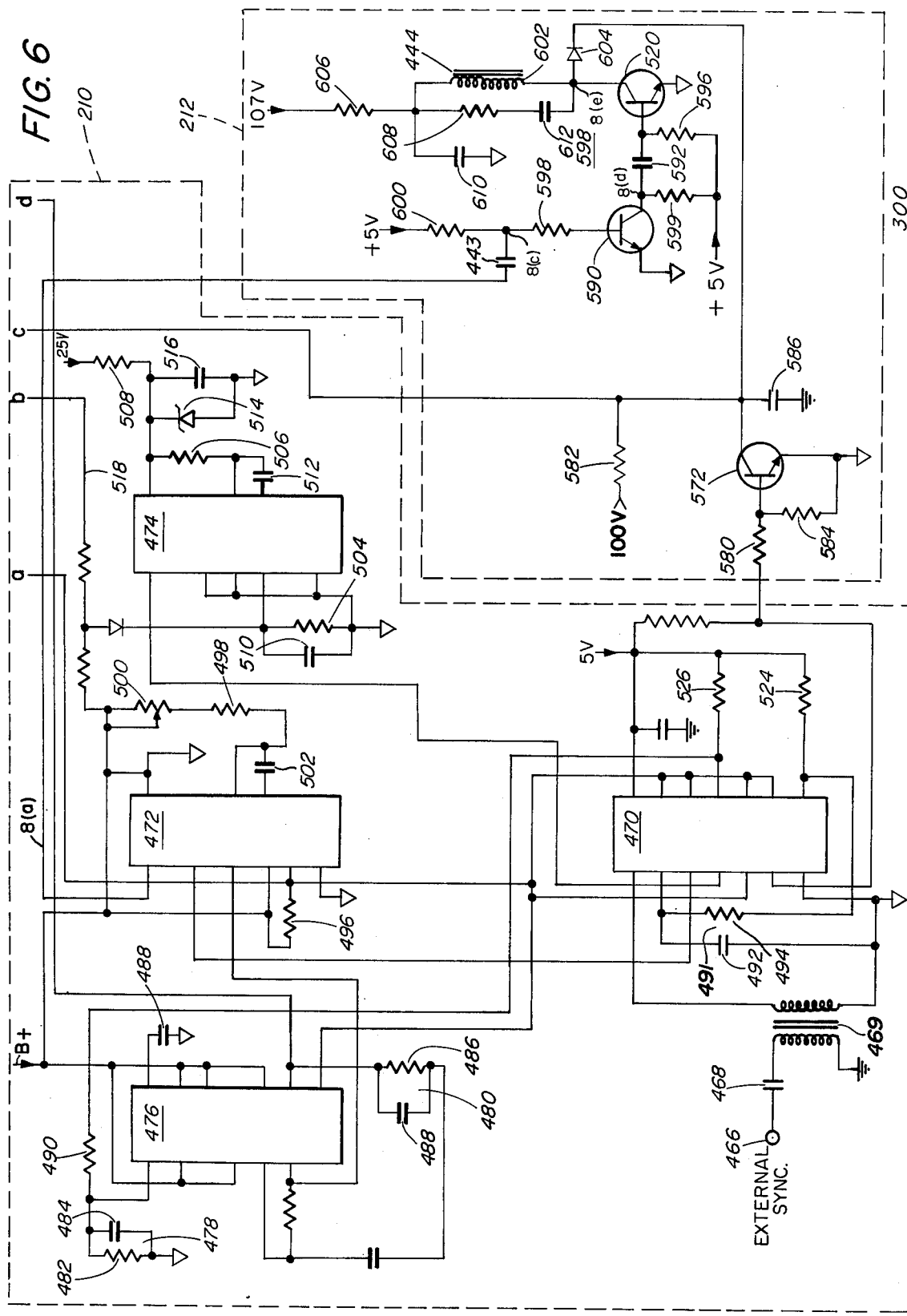

A pulse generator 104, which comprises a differentiating circuit differentiates waveform 8(a) and clips the positive portion to obtain waveform 8(c). After passage through a limiting amplifier, waveform 8(d), the pulse width of which corresponds to the converter ON time, is coupled to the base of transistor 106, which only conducts when the base is more positive than the emitter. When the base is more negative than the emitter, no current flows in the collector, which now stays positive. When the base-emitter junction of transistor 590, shown in FIG. 6, is driven positive, the transistor turns ON until the negative edge of waveform 8(a) is applied through the pulse generator, resulting in waveform 8(e) at the collector of transistor 106 which corresponds to transistor 520 of FIG. 6. This waveform is coupled via winding 108 across transformer 109 to the secondary winding 110 supplying the base current drive to the converter transistor 112. The voltage on winding 110 of FIG. 2 is illustrated by FIG. 8(f) and the corresponding base current to transistor 112 by FIG. 8(g).

The base drive turns transistor 112 ON in synchronization with the leading edge of waveform 8(a) while the lagging edge, which occurs about 22 microseconds later, corresponds to turn OFF. When transistor 112 is turned on, the winding 114 on transformer 116 stores energy in accordance with well-known principles such that when transistor 112 is turned OFF, the stored energy in the primary inductance discharges as a high voltage which, if not clipped by diodes 129 and 130, would exceed 1,000 volts and the transformer would resonate at a frequency in the region of 100 KHz were it not for these diodes. Diode 118 conducts on the backswing of the transformer voltage and results in the collector waveform 8(h) under normal load conditions. Backswing damping is provided by the load and the backswing diode 118 conducts negligible current. The secondary rectifying diode 120 rectifies only during the OFF time of the converter transistor, as is apparent from waveform 8(k) which corresponds to the output on secondary winding 122. A DC output is coupled to a load across capacitor 124, while an imaginary capacitance exists across the main power transformer 116, which is shown as capacitor 126. Resonance does not occur due to the clipping action of diodes 129, 130 and 118 and the transformer is not driven into saturation due to the provision of a suitable air gap. The high voltage portion of waveform 8(h) is clipped to approximately 550 volts by a zener diode 130 in series with diode 129 across a secondary winding in parallel with smoothing capacitor 132, the combination of which provides a return path to an auxiliary power supply for the high voltage, as will be explained with reference to FIG. 5. The base voltage drive waveform 8(i) corresponds to the transistor ON time, as will be explained.

Referring now to FIG. 3, there is shown an improved single switch pulse width modulated regulated power supply in accordance with the present invention. Line voltage of 115 or 230 volts is fed to an AC/DC line rectification circuit 202 for rectification to unregulated DC without line transformers, thereby reducing the required weight and also reducing the radiated fields associated with line transformers. The unregulated DC output of the line rectification circuit 202 is applied to a pulse width modulated switching regulator 204 which chops the unregulated DC at a pulse repetition rate determined by the system synchronization. The width of the pulse is determined by sampling the load for improved regulation. This switching regulator is switched ON and OFF by a control signal derived from the internal synchronization to develop a square wave of peak amplitude determined by the rectified DC from which an average DC level is obtained. This DC level is varied in accordance with the ON/OFF ratio of the switch; thus, by varying the pulse width, the output DC level is varied.

An overvoltage protection circuit 206 protects the loads against the possibility of a short circuit in the switching regulator transistor portion of circuit 204 by providing a signal which removes the drive to the DC/DC converter 212.

A sample of the regulated DC output of switching regulator 204 is coupled to a reference amplifier portion of the voltage regulator and pulse width modulator circuit 208 where it is amplified relative to a reference voltage in the amplifier to provide a continuously sensed DC level upon which an internally generated triangular waveform is superimposed, which combined waveform is the pulse width modulation waveform which modulates the switching regulator 204 and which is illustrated by FIG. 8(*l*).

A novel synchronized oscillator circuit 210 comprising a Schmitt trigger, a one-shot multivibrator and a gate delay circuit provides synchronization for the entire power supply. When supplying a group of displays, for example, the horizontal drive frequency of the display is typically 15.6 kilohertz, which is the supply external synchronization rate. If variations in this frequency occur within approximately five percent, the synchronized oscillator 210 locks to this frequency. Frequency variations greater than the predetermined percentage are ignored and the oscillator 210 becomes free running. Thus, the supply synchronization cannot be lost due to major variations in the external synchronization rate, and precise synchronization is provided when small frequency changes occur. The synchronization signal derived from oscillator 210 is supplied to the pulse width modulated switching regulator 204 as the pulse repetition rate and to the DC-to-DC converter circuit 212 as the switching frequency. The switching frequency output of oscillator 210 is amplified by the DC-to-DC converter drive circuit 214 and is then transformer coupled to DC-to-DC converter 212.

The converter 212 is a highly efficient single transformer switch for transforming the regulated DC voltage output of the switching regulator 204 into a cyclic waveform at the synchronization frequency which is transformed by power transformer 216 into a plurality of regulated and isolated low voltage loads illustratively shown as 218 through 224. High voltage is obtained from the DC-to-DC converter drive transformer by a high voltage circuit 225 which steps up the driver output voltage prior to application to a voltage doubler to obtain approximately 17 KV for use in the anode voltage of a display. Transients are eliminated on the display since this voltage is synchronized to the raster flyback, as is apparent by waveform 8(*f*).

In accordance with the novel features of the DC-to-DC converter 212, all of the output power is derived during the ON time of its transistor switch. Whatever voltage exists during the OFF time could, of course, be used, and in fact, this voltage drives the auxiliary power source 230 which drives the synchronous oscillator 210 and drive circuits 214, as will be explained with reference to FIGS. 5 and 7.

Overcurrent protection is provided by a protective circuit 226 to which is fed a current sample in series with DC/DC converter transistor 212 via a sampling network 228 which senses the output load. In the event of a current surge, the drive current from the line rectification circuit 202 is instantaneously removed from the pulse width modulator 208 and from the DC-to-DC converter 212. This switches the auxiliary power source 230 back to the line rectification circuit 202 with recycling in about 5 seconds.

Figure 5:
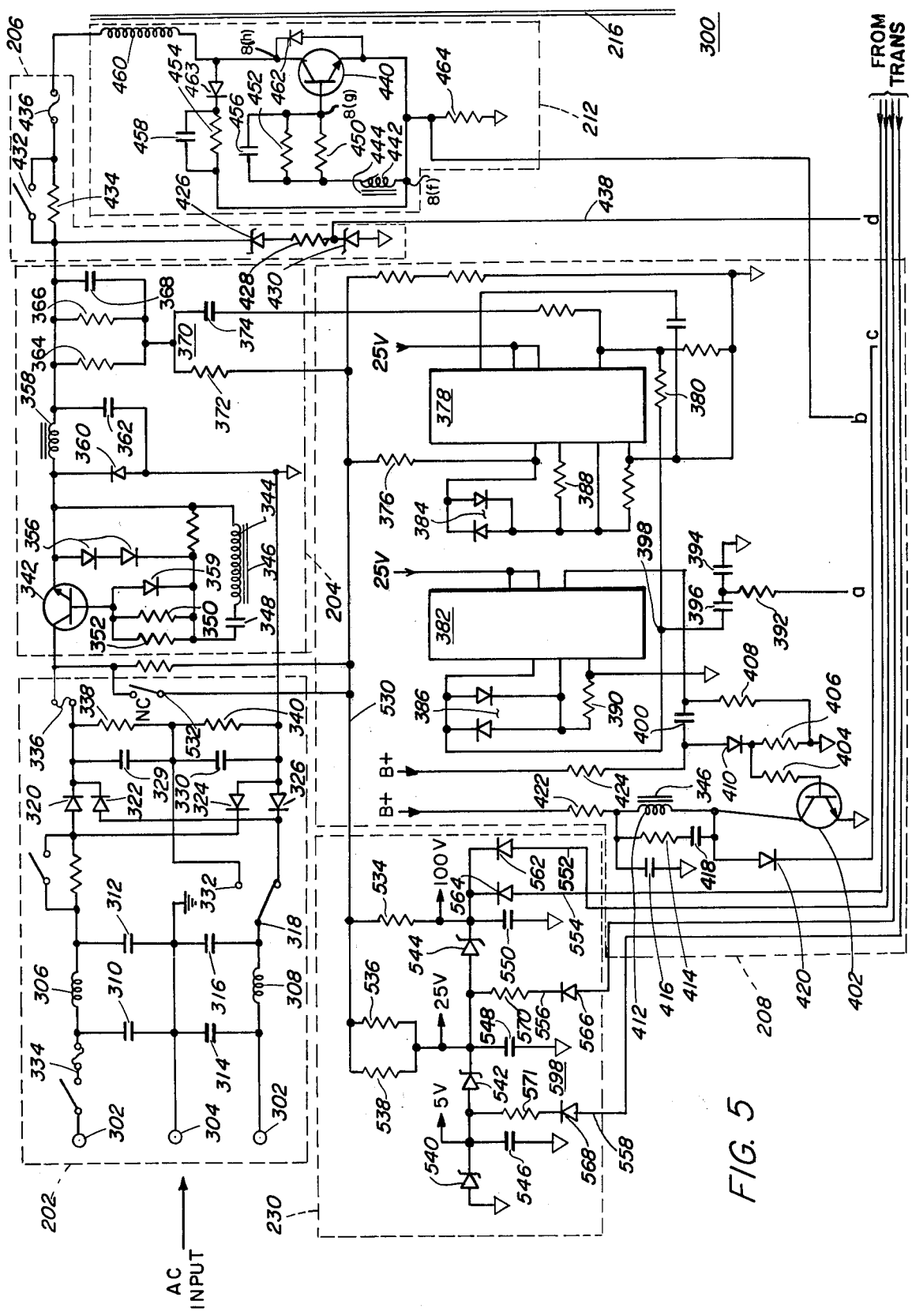
FIGS. 5, 6 and 7, taken together, illustrate a schematic diagram of the power supply of FIG. 3.
Figure 7:
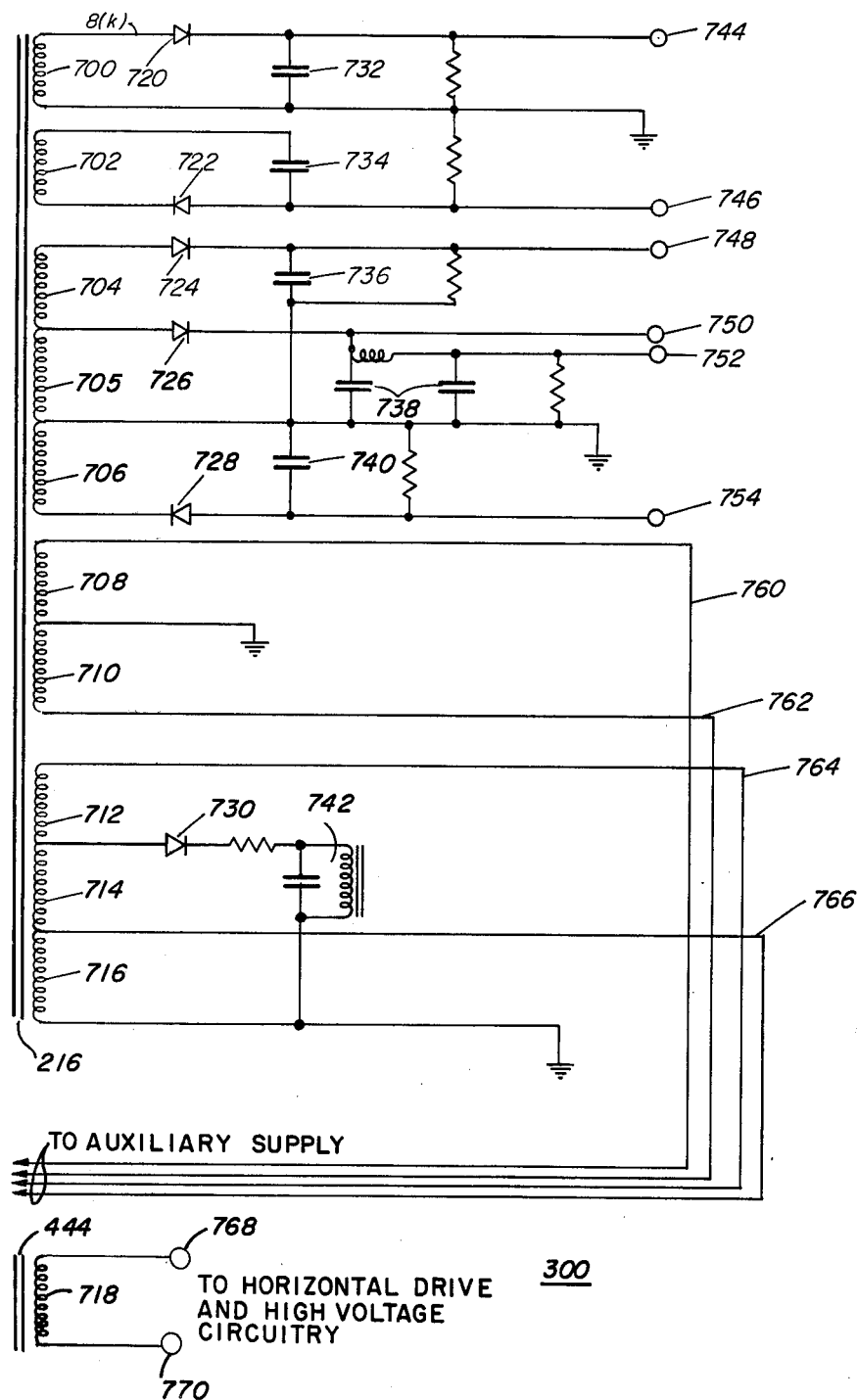

Referring now to FIGS. 5 through 7, a circuit diagram of the power supply shown in block form by FIG. 3 is illustrated generally at 300, which power supply is synchronized to its load when that load is, for example, a visual display of the television raster type or a microprocessor for on-site programming of groups of displays. A voltage source of, for example, either 60 cycle 115 or 230 volts is applied to the AC-to-DC line rectification network 202, the input to which is indicated generally at 302 in which network, in accordance with well-known practice, a ground 304 is provided for the third terminal of the plug. Inductors 306 and 308 with capacitors 310, 312, 314 and 316 prevent RF interference from entering or leaving the display on the AC power line. When the unit is to be used with a 230 volt AC input, the jumper 318 is in the position, as illustrated, and rectifiers 320, 322, 324 and 326 operate as a full wave bridge rectifier. Each half cycle of the input signal charges capacitors 329 and 330. Whe the unit is to be used with a 115 volt AC input, in which case the jumper 318 would be switched to contact 332, rectifiers 322 and 326 are removed from the circuit and diodes 320 and 324 operate as a full wave voltage doubler. Thus, the same voltage is developed across capacitors 329 and 330 with a 115 AC input as with a 230 volt AC input. Overload protection is provided by fuses 334 and 336 and leakage paths across the voltage doubler capacitors 329 and 330 are provided by resistors 338 and 340 respectively.

The rectified DC voltage from the rectification circuitry 202 is converted to a closely regulated DC voltage by the pulse width modulated switching regulator 204. The control provided by the switching regulator sets the overall operating level of the main transformer 216 and thus establishes the level for all of the power supply output.

The regulator switch itself comprises switching transistor 342, which is switched ON by the modulation signal, to switch the rectified DC at a pulse repetition rate corresponding to the system synchronization, as will be explained. Once turned ON, the emitter voltage is typically within three-tenths of a volt of the collector voltage out of approximately 260 volts DC. The pulse width modulation from the pulse width modulator 208 is inductively coupled via winding 344 of transformer 346 to transistor 342. Capacitor 348 charges and discharges for a period corresponding to the output of winding 344 with a protective network of resistors 350 and 352 supplying bias to the base of transistor 342 with protective diodes 356 providing alternate current paths.

When transistor 342 is switched ON, a linearly increasing current is generated in choke 358. When transistor 342 is switched OFF, the energy stored in choke 358 causes the voltage across it to tend to reverse; however, the output waveform of choke 358 is prevented from going negative by a freewheeling or backswing diode 360 which stops the voltage drop at 0 volts. When switching ON again occurs, after a number of cycles has occurred, an average DC voltage from the rectangular waveform is developed across smoothing and storage capacitor 362, and an average DC voltage of about 140 volts, for example, appears at the regulator output.

A sample of this average output regulator voltage is compared to a reference to provide output voltage control with feedback through the pulse width modulator to control the regulation which transistor 342 must perform. A sampling network of resistors 364 and 366 and smoothing capacitor 368 provides a path through filter 370 comprising resistor 372 and capacitor 374 and biasing resistor 376 to a reference amplifier 378 which is a Fairchild A723 integrated circuit or equivalent with an internal zener reference. The sampled output is amplified by amplifier 378 and compared to the internal zener voltage of approximately 7.2 volts. The output of reference amplifier 378 is coupled through resistor 380 to the input of another Fairchild uA723 reference amplifier or equivalent with an internal zener reference, shown as 382. Biasing and overvoltage protection for amplifiers 378 and 382 is provided by diode networks 384 and 386 respectively and by resistors 388 and 390 respectively.

The rectangular waveform output of the synchronized oscillator 210 is converted into a sawtooth by an integrating circuit comprising capacitor 394 and resistor 392. This sawtooth is coupled through coupling capacitor 386 where, at point 398, it is superimposed upon the amplified DC error signal output from amplifier 378 through resistor 380. This combined waveform is compared against the second internal zener reference in the second amplifier 382 and, depending upon the average level of the sawtooth, which is determined from the DC error level from amplifier 378, either a narrow or a wide pulse is coupled to the switching regulator transistor 342.

The operation of the pulse width modulation waveform is illustrated by FIG. 8(*l*) in which the solid line is a sawtooth voltage, the DC level of which changes according to the difference in output voltage relative to the reference to amplifier 378. The dotted waveform illustrates the modified pulse width which occurs when the reference level changes.

The pulse width modulation output from amplifier 382 is coupled through a coupling capacitor 400 and forward biased diode 410 biased by resistor 424 to an amplifier comprising transistor 402 which amplifier is biased by a resistive network of resistors 404, 406 and 408. The amplified modulation output of transistor 402 is transformer coupled via winding 412 of transformer 346 to the base of regulating transistor 342, as previously described. Transformer winding 412 is fed by a network comprising resistor 422 and filtering capacitor 416 which is grounded. Overvoltage or overcurrent turnoff is provided through diode 420.

Resistor 414 and capacitor 418 provide an AC coupled load over the primary winding 412.

The outputs of the supply are protected against the possible short circuiting of the switching regulator transistor 342 by an overvoltage protection circuit 206. Were transistor 342 to short circuit without such protection, a full 260 volts, rather than approximately 140 volts, would be applied to the power transformer 216. The overvoltage protective network 206 comprises dual zener reference diodes 426 and 430 which are coupled by resistor 428 to provide a positive voltage for firing a circuit in the synchronized oscillator when the switching regulator output voltage reaches approximately 160 volts. This circuit comprises a Schmitt trigger, as will be described. The collector voltages of transistor 402 and 520 are instantly shunted to ground through transistor 572 and diodes 604 and 420.

The DC-to-DC converter 212 will now be described. This highly efficient circuit employs only a single transistor 440, the switching rate of which is synchronized from the synchronized oscillator via the driver circuits by winding 442 of transformer 444 at the same rate as the pulse repetition frequency of the regulator 342 of approximately 15.6 kilohertz. Transistor 440 is driven through resistors 450 and 452 and capacitor 456 such that the synchronization pulse applied to its base switches it ON with zero voltage between collector and emitter and similarly switches it OFF with zero voltage between collector and emitter, thereby eliminating loss due to heating in the DC-to-DC converter.

Diode 462 provides a short circuit path for the energy stored in primary winding 460 during the second half of the turn OFF cycle.

When the base of transistor 440 is driven negative with respect to the emitter voltage by the voltage drive waveform appearing across winding 442, shown as FIG. 8(*f*), the voltage 8(*i*) appearing on the base of transistor 440, energy stored in the primary winding 460 of the transformer 216 causes the collector voltage, shown as FIG. 8(*h*), to go positive with respect to the supply voltages. The excursion of the collector backswing voltage is limited in the application by power that is supplied to the auxiliary power source by diodes 542 and 544 to approximately 550 volts, otherwise the collector backswing voltage could exceed the voltage rating of transistor 440.

While this positive voltage is developed across the transformer primary winding, the transformer magnetizing current, shown by FIG. 8(*j*), is building up in the opposite direction to that current rising in the transformer primary during transistor ON time. When this magnetizing current and the current supplied to the auxiliary power source approach the value of current at switch OFF, the voltage across the primary winding begins to fall until clamped by backswing diode 463. The voltage across transistor 440 is now zero and the transistor base voltage is turned ON by the drive waveform 8(*j*) which is suitably delayed to come ON after the collector voltage falls to zero. The load is coupled to the transformer secondary windings through diodes and filter capacitors which only conduct during the transistor ON period, as illustrated by FIG. 8(*k*).

Figure 4:
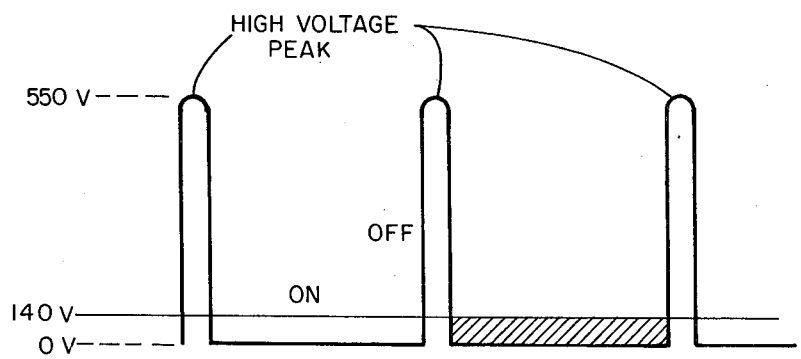
FIG. 4 is a waveform diagram of the voltage of a portion of the present invention.

This efficient operation is possible due to the unique utilization of the asymmetrical waveform illustrated by FIG. 4, which is the output at the collector of transistor 440, which is also shown as FIG. 8(*h*) to illustrate its timing. In accordance with this waveform, it is a principle of this invention that transistor 440 in ON most of the time, in excess of 65%, which gives the output its asymmetric characteristic. Substantially all of the output power is transferred during the ON time, as illustrated by the shaded portion of the waveform. It is known to store energy in an inductor, such as winding 460 of the power transformer 216 for a relatively long time duration, and then to switch it OFF for a relatively short time duration to obtain high voltage peaks. This is the flyback principle used in television to obtain the high voltage of as much as 25 KV necessary for the picture tube. The area under the high voltage peak and that under the low voltage ON pulse are equal relative to the supply voltage, such that the shorter the transistor OFF time becomes, the greater the waveform asymmetry becomes. The low voltage portion of the waveform, the converted 140 volts, is used only to build up energy in the inductor in conventional flyback circuits which in television is the deflection coil voltage, with no power being transferred to any secondary windings during this time period. It has been discovered that, in fact, in power converter application, this "opposite" portion or ON time of the high voltage waveform provides a more efficient mode of power transfer than is possible with two-transistor converters since during the actual switching from ON to OFF and vice versa, no voltage exists across the transistor. Of course, if desired, the high voltage peaks could be utilized in the present system; however, the power transfer of the controlled regulated DC alone provides higher efficiency than that of power supplies of the prior art and the high voltage peaks are used only to drive the auxiliary power supply during normal operation.

A protective path for transistor 440 is provided by diode 462 and the network comprising resistor 454 and capacitor 458 to prevent excessive voltages from appearing across transistor 440 under possible fault conditions.

Referring now to FIG. 6, the synchronized oscillator and DC-to-DC converter drive portions of the power supply circuitry are illustrated. The synchronized oscillator 210 receives external synchronization from the display or microprocessor clock at terminal 466 at a rate which is normally outside the audio range, for example, at a rate of 15.6 KHz or higher frequency. The circuit is arranged to lock onto the external synchronization, and if that external synchronization is lost, to become free running thereby insuring proper operation of the oscillator whether or not external synchronization is lost. Variations typically within five percent are accommodated by automatic adjustment of the internal synchronization rate while wide variations (greater than five percent) are ignored.

The external synchronization frequency is transformer coupled through coupling capacitor 468 and transformer 469 to the input of a two input gate 470 comprising a Texas Instrument 7400 integrated circuit. The free-running multivibrator portion of synchronized oscillator 210 comprises one-shot multivibrator 472 which is a Texas Instrument integrated circuit, number 74121 or equivalent, and a Schmitt trigger which is one of the Schmitt triggers contained by the dual Schmitt trigger 476, which is a Texas Instrument integrated circuit, number 7413 or equivalent.

To assure that the free-running oscillator always starts, the Schmitt trigger will run at a low frequency of about 1 KHz. The multivibrator-Schmitt trigger loop is coupled through integrating networks 478 and 491 comprising resistor 482 and capacitor 484 and resistor 494 and capacitor 492 respectively provide alternative delays to allow the one-shot multivibrator 472 to recover. The difference in these delay times provides a "window" during which time an external synchronizing pulse can be accepted.

Referring now to the waveforms illustrated by FIGS. 8(a) and 8(b), the operation of one-shot multivibrator 472 and Schmitt trigger 478 is illustrated. The multivibrator 472 can be triggered by an external synchronizing pulse occurring between $t_1$ and $t_3$ or by the Schmitt trigger at $t_3$. Time $t_1$ establishes the minimum reset time that an external pulse can trigger the one-shot multivibrator, while $t_3$ establishes the maximum time that an external pulse can trigger the multivibrator. Time $t_2$ represents the external pulse time within which triggering can occur, or the "window" provided by times $t_1$ and $t_3$. Typically the time between $t_0$ and $t_1$ is 8 microseconds, between $t_1$ and $T_3$ is 8 microseconds, and the time between $t_1$ and $t_2$ is 4 microseconds. The total period of oscillation is typically 64 microseconds, which will increase to 68 microseconds when the trigger is removed. When external synchronization is present within $t_1$ and $t_3$, the multivibrator will be directly triggered at $t_2$; however, when external synchronization is off by greater than the window value of, for example, 10%, which would be outside the window provided by $t_3$, a pulse occurring at $t_3$ from the Schmitt trigger 476 retriggers the one-shot multivibrator 472, thereby maintaining the oscillation.

Once triggered, multivibrator 472 generates a delayed pulse through gate 470, with the amount of delay being determined by an integrator comprising capacitor 492 and resistor 494. The integrator output provides a delay through gate 470 which enables the multivibrator 472 to recover for reset before allowing retriggering as the circuit has a maximum duty cycle of approximately 90 percent. One-shot multivibrator 472 is biased by a resistive network of resistors 498 and 500 with the output pulse width being determined by the value of that resistor network and by capacitor 502. The circuit operates as a digital frequency filter since the oscillator output is only sensitive to a small range of synchronization frequency variation. If no synchronization pulse occurs during the "window" period, Schmitt trigger 476 is fired after a delay provided by the integrating circuit comprising resistor 490 and capacitor 484. The output of the Schmitt trigger then retriggers the one-shot multivibrator 472.

When too much current flows through resistor 464 in series with the DC-to-DC converter transistor 440, the current causes an increase in voltage across resistor 464 which appears on line 518 and triggers one-shot multivibrator 474 to instantaneously remove the drive from transistors 402 and 520 which in turn removes the drive from transistors 342 and 440 by means of turning OFF amplifier transistor 572. In the overvoltage condition, zener diode 426 conducts to turn ON the other Schmitt trigger in the dual Schmitt trigger 476 which instantaneously cuts the drive to transistors 342 and 440. When these conditions occur, the auxiliary power source 230 comes ON in order that power is continuously applied to the rest of the circuitry from the direct drive. Resistors 496, 524 and 526 are pull-up resistors associated with multivibrator 472 and gate 470 respectively.

The recycle time of one-shot multivibrator 474 is about 5 seconds, which time is determined by the values of capacitor 512 and resistor 506. After the expiration of this recycle time, the supply attempts to come ON again. If the overcurrent condition still exists, the supply will cut OFF again and recycle. Zener diode 514, capacitor 516 and supply resistor 508 provide a regulated 5 volts for multivibrator 474.

The auxiliary power source 230, driven from the rectified line, starts the synchronized oscillator 210 and the pulse width modulator 208 before the switching regulator and output circuits are operative. Once the supply is turned ON, the auxiliary power source derives its power from the output load rather than from the line rectification circuitry to increase efficiency.

The auxiliary power source 230 is a resistive network which is fed start-up DC voltage via line 530 from normally closed switch 532, which is connected to the main DC power line. This start-up DC voltage is divided by a resistive grid of resistors 534, 536 and 538 to provide 5 volts, 25 volts and 100 volts across zener diodes 540, 542, and 544 respectively, with the zener output voltages filtered by filtering capacitors 546, 548 and 550 respectively, all of which are returned to common. Lines 552 and 554 provide the 100 volt output to the drive circuits through diodes 562 and 564; lin 556 provides a 37 volt output through diode 566 and resistor 570 to supply the 25 volt zener diode; and line 558 provides an 11 volt output through diode 568 and resistor 571 to the 5 volt zener diode.

The DC-to-DC converter drive circuit 212 couples the synchronization signal via capacitor 443 to the DC-to-DC converter. The synchronization signal is coupled from one-shot multivibrator 472 through capacitor 443 and resistor 598 to amplifier 590 which is biased by resistor 600. A power amplifier 520, coupled by coupling capacitor 592 and biased by biasing resistor 596, drives winding 602 of transformer 444 at the synchronization rate. Voltage is supplied through resistor 606, decoupled by capacitor 610, and damping across winding 602 is provided by resistor 608 and capacitor 612.

An overvoltage or overcurrent condition causes a positive voltage to be developed at the base of transistor 572 through resistors 580 and 584. The collector of transistor 572 is coupled to the collectors of the pulse width modulator driver and the DC-to-DC converter driver through diodes 420 and 604.

Referring now to FIG. 7, the output portion of the power supply is illustrated. The various output voltages required for the operation of the driven displays are developed by windings 700, 702, 704, 705, 706, 708, 710, 712, 714 and 716 on the secondary of power transformer 216 which, in a typical case, develop output voltages of 35 volts, −35 volts, 12 volts, 5 volts, −12 volts, 100 volts and internal supply voltages of 37 volts and 11 volts DC. Conventional fast switching rectifier diodes 720 through 730 and associated filtering capacitors 732 through 742 provide the rectified filtered DC outputs at terminals 744 through 754. As previously described, diodes 720 through 730 rectify only during the ON time of the DC-to-DC converter transistor 440. The outputs of windings 708, 710, 712 and 714 provide 100 volt, 37 volt and 11 volt references to the auxiliary power supply via lines 760, 762, 764 and 766. An additional winding 718 on the DC-to-DC converter drive output transformer 444 can supply a drive pulse to an external circuit such as the horizontal drive to the display at terminals 768 and 770. A high voltage of approximately 17 kilovolts may be derived from this winding by amplifying the secondary voltage through another transformer and a voltage doubler to obtain a synchronized anode voltage for a cathode ray tube.

The displays of the present invention may be, for example, of the type disclosed in U.S. Pat. No. 3,774,161.

While particular embodiments of the invention have been shown and described, various modifications thereof will become apparent to those skilled in the art and, therefore, it is not intended that the invention be limited to the disclosed embodiments or to details thereof and departures may be made therefrom within the spirit and scope of the invention, as defined in the appended claims.

What is claimed is:

1. In combination:
a transformer, said transformer having a primary winding and first and second secondary windings;
a single transistor switching element;
means for a DC current to said switching element through said primary winding; and
means for turning said switching element ON and OFF at a predetermined rate, said turning said switching element ON and OFF occurring only when the voltage across said switching element is substantially zero, a high voltage being produced across a load coupled to said first secondary winding when said switching element is OFF and a low voltage being produced across a load coupled to said second secondary winding when said switching element is ON, all input current for producing said high voltage and low voltage flowing through said single transistor switching element.

2. A combination in accordance with claim 1 wherein the ON time of said transistor is substantially greater than the OFF time of said transistor such that the voltage switched is an asymmetric waveform of high voltage peaks during the OFF time and low voltage during the ON time.

3. A combination in accordance with claim 2 further including first and second rectification means coupled to said first and second secondary windings respectively, a high DC voltage being produced when said switching element is OFF and a low DC voltage being produced when said switching element is ON.

4. A DC-to-DC converter comprising:
a transformer, said transformer having a primary winding and first and second secondary windings;
a single transistor switching element;
means for supplying DC current to said switching element through said primary winding; and
means for turning said switching element ON and OFF at a predetermined rate such that said DC current is converted to an asymmetric waveform and switched across said primary winding at a predetermined rate, a high voltage being produced across a load coupled to said first secondary winding when said switching element is OFF and a low voltage being produced across a load coupled to said second secondary winding when said switching element is ON, all input current for producing said high voltage and said low voltage flowing through said single transistor switching element.

5. A DC-to-DC converter in accordance with claim 4 wherein said asymmetric waveform comprises high voltage peaks occurring during the OFF time of said switching element and low voltage pulses occurring during the ON time of said switching element such that said DC power is converted to said low voltage pulses.

6. A DC-to-DC converter in accordance with claim 5 further including means for clipping said high voltage peaks below a predetermined value.

7. A pulse width modulated switching power supply comprising:
a transformer, said transformer having a primary winding and first and second secondary windings;
regulator means for switching an input DC current from a DC voltage source to produce an asymmetric waveform, across said primary winding, said switching occurring in response to a synchronization signal, and said switching occurring only when the voltage across a single transistor switching element is substantially zero all input current to said regulator means flowing through said single transistor switching element;
synchronized oscillator means for deriving said synchronization signal from an external source such that said synchronized oscillator means is synchronized to said external source within predetermined limits of frequency variation of said external source and for generating internal synchronization when said external synchronization frequency exceeds said predetermined limits; and
transformer means for coupling said asymmetric waveform to first and second loads coupled to said first and second secondary windings, a high voltage being produced across said first load when said switching element is OFF and a low voltage being produced across said second load when said switching element is ON.

8. A pulse width modulated power supply in accordance with claim 7 wherein the pulse repetition rate of said asymmetric waveform is said derived synchronization frequency.

9. A pulse width modulated power supply in accordance with claim 8 wherein said switching element comprises a single transistor.

10. A synchronization circuit comprising:
means capable of being triggered in response to an external pulse applied to a first input of said means, said means comprising a one-shot multivibrator having a predetermined reset time duration;
means coupled to a second input of said first mentioned means for triggering said first mentioned means when said external pulse does not occur within a predetermined time duration; and
means for switching power in response to said first mentioned means, said switching means comprising a transistor, switching occurring only when the voltage across said transistor is substantially zero, a high voltage being produced when said switching means is OFF and a low voltage being produced when said switching means is ON, all input current for producing said high voltage and said low voltage flowing through said single transistor switching element.

11. A synchronization circuit in accordance with claim 10 wherein said said means for triggering said first mentioned means generates a pulse to retrigger said one-shot multivibrator at a predetermined time after the reset time of said multivibrator such that retriggering of said multivibrator from said external pulse can only occur during the time period between said predetermined reset time and said predetermined time after the reset time.

12. A synchronization circuit in accordance with claim 11 wherein said means for triggering said first mentioned means comprises a Schmitt trigger.

13. In combination:
means for converting an AC voltage to a first DC voltage;
means for converting said first DC voltage to a second DC voltage;
means for generating a third DC voltage at a higher voltage than either said first or second DC voltages;
means for synchronizing said first, second, and third DC voltages such that all of said DC voltages are synchronized to each other and to a cyclic characteristic of an external system; and
means for maintaining synchronization between said first, second, and third DC voltages when said cyclic characteristic varies beyond predetermined limits.

14. A combination in accordance with claim 13 wherein said first DC voltage is a regulated DC voltage;
said second DC voltage is the rectified output of said converting means; and
said third DC voltage is a high voltage derived from said synchronization means for providing the anode voltage to a cathode ray tube.

15. In combination:
a transformer, said transformer having a primary winding and first and second secondary windings;
a single transistor switching element coupled to said primary winding;
digital control means for turning said switching element ON and OFF at a predetermined rate, said turning said switching element ON and OFF occurring only when the voltage across said switching element is substantially zero, a high voltage being produced across a load coupled to said first secondary winding when said switching element is OFF and a low voltage being produced across a load coupled to said second secondary winding when said switching element is ON, all input current for producing said high voltage and said low voltage flowing through said single transistor switching element and said primary winding.

16. The combination of claim 15 wherein said digital control means comprises pulse generator means.

17. The combination of claim 16 wherein said digital control means further comprises synchronizable multivibrator means.

* * * * *

UNITED STATES PATENT OFFICE
CERTIFICATE OF CORRECTION

Patent No. 4,073,003                    Dated Feb. 7, 1978

Inventor(s) Derek Chambers

It is certified that error appears in the above-identified patent and that said Letters Patent are hereby corrected as shown below:

Change the title from "POWER SUPPLY" to - HIGH EFFICIENCY LOW-LOSS POWER SUPPLY - ;

Column 6, line 61: change "A723" to - uA723 - ;

Column 7, line 8: change "386" to - 396 - ;

Column 7, line 21: change "to" to - in - ;

Column 8, line 35: change "in" to - is - ;

Column 10, line 58: change "1in" to - line - ;

Signed and Sealed this

*Thirteenth* Day of *June 1978*

[SEAL]

Attest:

RUTH C. MASON
*Attesting Officer*

DONALD W. BANNER
*Commissioner of Patents and Trademarks*